United States Patent [19]

Murabayashi

[11] Patent Number: 4,716,198

[45] Date of Patent: Dec. 29, 1987

[54] RESIN COMPOSITION

[75] Inventor: Katuyoshi Murabayashi, Sakai, Japan

[73] Assignee: Daicel Chemical Industries, Ltd., Osaka, Japan

[21] Appl. No.: 743,536

[22] Filed: Jun. 11, 1985

[30] Foreign Application Priority Data

Jun. 19, 1984 [JP] Japan ............................... 59-124493

[51] Int. Cl.$^4$ ........................................... C08L 53/00
[52] U.S. Cl. ..................................... 525/92; 525/166;
525/167; 525/392; 525/905; 525/66
[58] Field of Search ................ 525/92, 397, 391, 392, 525/905, 167, 66, 177

[56] References Cited

U.S. PATENT DOCUMENTS 3,865,792  2/1975  Lee ...................................... 525/167

FOREIGN PATENT DOCUMENTS 3104409  8/1982  Fed. Rep. of Germany ........ 525/66
2533577  3/1984  France ................................ 525/167
0639903  12/1978  U.S.S.R. ............................... 525/92

Primary Examiner—Wilbert J. Briggs, Sr.
Assistant Examiner—A. Carrillo
Attorney, Agent, or Firm—Flynn, Thiel, Boutell & Tanis

[57] ABSTRACT

A resin composition, suitable for moulding by injection, comprises a styrene resin or a polyphenylene ether resin and an amide copolymer having an ester group.

13 Claims, No Drawings

RESIN COMPOSITION

The invention relates to a resin composition, which is suitable for injection molding, having an excellent abrasion resistance. It comprises a styrene resin or a polyphenylene ether resin. The invention further provides an article obtained by injection-molding the resin composition.

DESCRIPTION OF PRIOR ARTS

Because of their poor resistance to frictional abrasion, styrene resins and polyphenylene ether resins have not been applied to parts on which frictional abrasion is exerted. Further, when a part must have in part frictional abrasion resistance for reasons of design, it is strengthened in part by insert-molding or inserting a small part molded from a resin of good frictional abrasion resistance, such as nylon resin or acetal resin. Further, when frictional abrasion resistance on a flat plane is required, this requirement has been met by laminating therewith a sheet or film of a fluorocarbon resin or a nylon resin.

However, although the combined use of such resins is possible when a molded resin article has a simple shape, it is difficult when a molded resin article has a complicated shape because of difficult assembling or a complicated insert. Thus, the combined use of resins is limited by shapes and requires an increase in the number of steps of manufacture and so has many problems.

It is an object of the present invention to provide a molded article of good frictional abrasion resistance without encountering the above disadvantages merely by injection-molding a styrene resin or a polyphenylene ether resin.

DESCRIPTION OF THE INVENTION

The invention relates to a resin composition which comprises (1) 100 parts by weight of a styrene resin or a polyphenylene ether resin and (2) 0.01 to 50 parts by weight of an ester group-containing amide copolymer and then an article of the resin composition molded by injection.

Unlike polyamide, the ester group-containing polyamide copolymer itself has a low critical PV value and besides it is not particularly excellent in frictional resistance. Further, unlike silicone oil, carbon, or the like, the copolymer itself has no lubricating property.

It has been found that a molded article obtained from a material prepared by mixing such a high-molecular compound with a styrene resin or a polyphenylene ether resin can show a markedly improved frictional property though it is based on the styrene resin or the polyphenylene ether resin.

Examples of the styrene resins used include polystyrene, rubber-modified polystyrene, poly(styrene/acrylonitrile) copolymer and rubber-reinforced (styrene/acrylonitrile) copolymer (ABS resin). A mixture of at least two of these styrene resins may also be used. Further, those styrene resins which are derived by replacing part of the styrene or acrylonitrile in the above resins with unsaturated monomers copolymerizable with styrene, such as α-methylstyrene, acrylate esters, methacrylate esters and unsaturated dicarboxylic acids or anhydrides thereof, such as maleic acid and maleic anhydride, are also included.

Further a mixture which comprises 50 wt.% or above of the styrene resin and 50 wt.% or below of a thermoplastic resin other than the ester bond-containing polyamide copolymer, such as polycarbonate resin, vinyl chloride resin, or polyolefin resin, can also be used as the styrene resin applicable to the present invention.

The polyphenylene ethers used in the present invention are those obtained by polycondensing at least one kind of a mononuclear phenol represented by general formula (I):

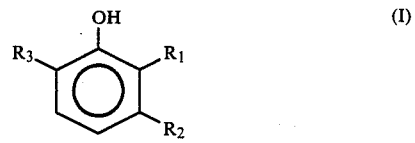

(wherein $R_1$ is a lower alkyl group of 1 to 3 carbon atoms, $R_2$ and $R_3$ are each a hydrogen atom or a lower alkyl group of 1 to 3 carbon atoms, and a lower alkyl substituent must be situated on one or both ortho positions in respect to the hydroxyl group)

and may be homopolymers or copolymers, and include also a graft copolymer obtained by graft-polymerizing a vinyl aromatic compound with a polyphenylene ether.

Further, the polyphenylene ether resins defined in the present invention include also a composition obtained by mixing said polyphenylene ether with other resin components.

Examples of the mononuclear phenols represented by general formula (I) include 2,6-dimethylphenol, 2,6-diethylphenol, 2,6-dipropylphenol, 2-methyl-6-ethylphenol, 2-methyl-6-propylphenol, 2-ethyl-6-propylphenol, m-cresol, 2,3-dimethylphenol, 2,3-diethylphenol, 2,3-dipropylphenol, 2-methyl-3-ethylphenol, 2-methyl-3-propylphenol, 2-ethyl-3-methylphenol, 2-ethyl-3-propylphenol, 2-propyl-3-methylphenol, 2-propyl-3-ethylphenol, 2,3,6-trimethylphenol, 2,3,6-triethylphenol, 2,3,6-tripropylphenol, 2,6-dimethyl-3-ethylphenol, and 2,6-dimethyl-3-propylphenol. Examples of the polyphenylene ethers obtained by polycondensing at least one of the above phenols include poly(2,6-dimethyl-1,4-phenylene)ether, poly(2,6-diethyl-1,4-phenylene)ether, poly(2,6-dipropyl-1,4-phenylene)ether, poly(2-methyl-6-ethyl-1,4-phenylene)ether, poly(2-methyl-6-propyl-1,4-phenylene)ether, poly(2-ethyl-6-propyl-1,4-phenylene)ether, 2,6-dimethylphenol/2,3,6-trimethylphenol copolymer, 2,6-dimethylphenol/2,3,6-triethylphenol copolymer, 2,6-diethylphenol/2,3,6-trimethylphenol copolymer, and 2,6-dipropylphenol/2,3,6-trimethylphenol copolymer.

As said other thermoplastic resin components which are mixed with the polyphenylene ethers, vinyl aromatic resins are suitable. These resins have at least 25% by weight of monomer structural units represented by general formula (II):

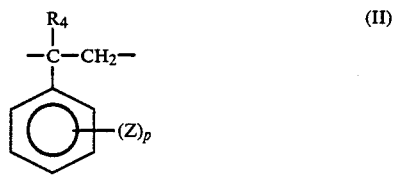

(wherein $R_4$ is a hydrogen atom or a lower alkyl group, z represents a halogen atom or a lower alkyl group, and p is 0 or a positive integer of from 1 to 3) in the polymer.

Examples of these resins include polystyrene, rubber-reinforced polystyrene, poly(styrene/acrylonitrile) copolymer, and rubber-reinforced (styrene/acrylonitrile) copolymer, and further include those resins derived by replacing part of the styrene or acrylonitrile in the above resins with unsaturated monomers copolymerizable with styrene, such as α-methylstyrene, acrylate esters, methacrylate esters, unsaturated dicarboxylic acids or anhydrides thereof, and a mixture of at least two of these may also be used. Further, other thermoplastic resins such as copolymers of diene compounds with vinyl aromatic compounds, such as polybutadiene and polyisoprene; and elastomers such as nitrile rubber, ethylene/propylene copolymers, ethylene/propylene/diene copolymers, Thiokol rubbers, polysulfide rubber, acrylic acid rubber, polyurethane, and polyester elastomers are also applicable to the present invention.

The polyphenylene ether resins (PPE resins) to use in the present invention include a poly(2,6-dimethyl-1,4-phenylene)ether, MW of 20,000~150,000, obtained by the so-called oxidative coupling reaction of 2,6-dimethylphenol by passing oxygen in the presence of cuprous chloride, or a cocondensed polyphenylene ether obtained by cocondensing a nucleus-substituted phenol such as 2,3,6-trimethylphenol with 2,6-dimethylphenol and further includes a PPE resin modified with up to 40 wt.% of a polystyrene resin or a rubber-graft polystyrene resin (HI-PS resin) in order to improve the flow of the poly(2,6-dimethyl-1,4-phenylene)ether or the cocondensed polyphenylene ether. This modification is performed usually by mixing, but grafting may also be applied.

It is preferable to mix 0.01 to 50 parts by weight, desirably 0.1 to 30 parts by weight, more desirably 0.5 to 15 parts by weight of the ester bond-containing polyamide copolymer with 100 parts by weight of the styrene resin or the polyphenylene ether resin.

When the amount of said polyamide copolymer mixed is smaller than 0.01 part by weight per 100 parts by weight of the styrene resin or the polyphenylene ether resin, the effect of improving frictional abrasion resistance is small. When this amount is larger than 50 parts by weight per 100 parts by weight of the styrene resin or the polyphenylene ether resin, the mechanical strength is decreased, which is not desirable.

The ester bond-containing polyamide copolymers used in the present invention are those having ester bonds in a polyamide copolymer. For example they are 1. polymers composed of polyamide blocks (a) and polyester blocks (b), and
2. polymers comprising polyamide blocks (a) and polyol blocks (c), both blocks being linked with each other by an ester bond.

The content of component (a) in said polyamide copolymer is 99 to 10, desirably 90 to 20, more desirably 80 to 30% by weight, based on the total copolymer.

When the content of component (a) is higher than 99%, the effect of improving abrasion resistance is small, while when it is lower than 10%, the mechanical strength is decreased.

The polyamide block (a) preferably results from a polyamide-forming compound, that is, an aminocarboxylic acid having 6 to 12 carbon atoms, a lactam having 6 to 12 carbon atoms or a nylon mn salt in which the total of m and n is from 12 to 24. In the nylon mn salt, m indicates the diamine portion and n shows the diacid portion.

The polyamide-forming compound is an aminocarboxylic acid such as ω-aminocaproic acid, ω-aminoenanthic acid, ω-aminocaprylic acid, ω-aminopelargonic acid, ω-aminocapric acid, 11-aminoundecanoic acid, and 12-aminododecanoic acid; lactams such as caprolactam and laurolactam; and nylon mn salts such as nylons 6.6, 6.10, 6.12, 11.6, 11.10, 11.12, 12.6, 12.10, and 12.12.

Polyesters (b) mentioned in the present invention include.

(1) polyesters prepared from diacids and diols, and
(2) polycaprolactone-polyesters prepared from ε-caprolactone, ω-hydroxycaproic acid or a $C_1 \sim C_3$ alkyl ester thereof.

Examples of the polyesters prepared from diacids and diols include polymer units formed from aromatic dicarboxylic acid components such as phthalic acid, isophthalic acid, terephthalic acid, naphthalene-2,6-dicarboxylic acid, naphthalene-2,7-dicarboxylic acid, diphenyl-4,4'-dicarboxylic acid, and diphenoxyethanedicarboxylic acid; alicyclic dicarboxylic acids such as 1,4-cyclohexanedicarboxylic acid, 1,2-cyclohexanedicarboxylic acid, and dicyclohexyl-4,4'-dicarboxylic acid, and aliphatic dicarboxylic acids such as succinic acid, oxalic acid, adipic acid, sebacic acid, and dodecanedioic acid, and diol components such as ethylene glycol, diethylene glycol, triethylene glycol, tetraethylene glycol, propylene glycol, 1,4-butanediol, 1,3-butanediol, neopentyl glycol, 1,5-pentanediol, 1,6-hexanediol, polyethylene glycol, polypropylene glycol, and polytetramethylene glycol. These ester-forming components can be used alone or in the form of copolymer.

The polycaprolactone polyesters can be obtained, for example, as follows. Namely, in producing a polycaprolactone polyester by polymerizing ε-caprolactone, water or a compound having a hydroxyl group on each end is used as the polymerization initiator.

Examples of the polymerization initiators include resorcinol, pyrocatechol, hydroquinone, pyrogallol, chloroglucinol, benzenetriol, bisphenol-A, bisphenol-F, an ethylene oxide adduct of each before-mentioned compound, dimethylolbenzene, cyclohexanedimethanol, tris(2-hydroxylethyl)isocyanurate, ethylene glycol, diethylene glycol, triethylene glycol, propylene glycol, dipropylene glycol, 1,4-butanediol, 1,3-butanediol, 2-methyl-1,3-propylene glycol, neopentyl glycol, 1,5-pentanediol, glycerin, trimethylolpropane, 1,6-hexanediol, pentaerythritol, sorbitol, glucose and sucrose. Further the initiator includes a polyesterpolyol having an average molecular weight of 200 to 6,000 which has been formed from a dicarboxylic acid component such as terephthalic acid, isophthalic acid, adipic acid, sebacic acid, undecane-dicarboxylic acid and dodecane-dicarboxylic acid, and a polyol component such as ethylene glycol, diethylene glycol, triethylene glycol, propylene glycol, 1,4-butanediol, neopentyl glycol, 1,5-pentanediol, 1,6-hexanediol, trimethylolpropane, glycerin, pentaerythritol and sorbitol. It moreover includes polyethylene glycol, polytetramethylene glycol, a block or random copolymer of ethylene oxide and propylene oxide, a block or random copolymer of ethylene oxide and tetrahydrofuran, each copolymer having an average molecular weight of 200 to 6,000.

The production (polycondensation reaction) of a polyester-polyamide containing polyamide blocks (a) and polyester blocks (b) may be carried out by a usual method. Namely, the polycondensation reaction is carried out with agitation at a reaction temperature of 220° to 280° C. in a high vacuum of below 5 mmHg, desirably below 1 mmHg in the presence of a catalyst.

Although there is a production process in which the polyester blocks are first prepared and then converted into a polyester-amide, it is also possible that monomers for forming a polyester and monomers for forming a polyamide are fed simultaneously into a polymerization kettle to form a polyester-amide.

In the production of the polyester-amide, a catalyst can give a good result. Especially, tetraalkyl titanates such as tetrabutyl titanate and tetramethyl titanate and titanium metal oxalates such as titanium potassium oxalate are desirable. In addition, tin compounds such as dibutyltin oxide and dibutyltin laurate and lead compounds such as lead acetate can be mentioned.

In the production of the polyester-amide comprising polyamide blocks and polyester blocks according to the present invention, the both terminals of a polyester component may be diols or diacids.

When the both terminals are diols, it is possible to use a dicarboxylic acid of 4 to 36 carbon atoms.

Examples of the dicarboxylic acids of 4 to 36 carbon atoms include aromatic dicarboxylic acids such as phthalic acid, isophthalic acid, terephthalic acid, naphthalene-2,6-dicarboxylic acid, naphthalene-2,7-dicarboxylic acid, diphenyl-4,4'-dicarboxylic acid, and diphenoxyethanedicarboxylic acid, alicyclic dicarboxylic acids such as dicyclohexyl-4,4'-dicarboxylic acid, and aliphatic dicarboxylic acids such as succinic acid, oxalic acid, adipic acid, sebacic acid and dodecanedicarboxylic acid. Especially, terephthalic acid isophthalic acid, 1,4-cyclohexanedicarboxylic acid, adipic acid, sebacic acid and dodecanedicarboxylic acid can be desirably used. A dimer acid may be used for this purpose.

When the both terminals are diacids, diamines are used.

As the diamines, aromatic, alicyclic and aliphatic diamines are used, each preferably having 4 to 36 carbon atoms. Hexamethylenediamine and a dimer diamine are most preferable in the aliphatic diamine. In the alicyclic diamine, bis(4,4-aminocyclohexyl)methane, isophorone and 1,3- or 1,4-bis(aminomethyl)cyclohexane are preferable. In the aromatic diamine, xylenediamine and diaminodiphenylmethane are preferable.

It is also possible in the present invention to replace a part of the polyester component (b) by a soft component other than a polyester such as a polyalkylene glycol, for instance, polytetramethylene glycol and polypropylene glycol, in such an amount that the above discussed advantages of the invention may be attained.

Examples of polyol blocks (c) in the present invention are polyols of a number-average molecular weight of 500 to 3000, for example, poly(alkylene oxide)glycols.

Examples of the poly(alkylene oxide)glycols include polyethylene glycol, poly(1,2- or 1,3-propylene oxide)glycol, poly(tetramethylene oxide)glycol, poly(hexamethylene oxide)glycol, ethylene oxide/propylene oxide block or random copolymers, and ethylene oxide/tetrahydrofuran block or random copolymers.

In the polymerization of polyamide blocks (a) with polyol blocks (c), the above-mentioned synthetic process for the polyester-amide is applicable.

A polymer comprising polyamide blocks (a) and polyol blocks (c), both blocks having been linked with each other by an ester bond, is called a polyetherester-amide elastomer. It is disclosed in Japanese Patent Publication No. 45419/1981.

In this case, a diacid can be used as a terminal modifier or a molecular weight modifier. As the diacids, those mentioned above can be used.

As mentioned above, the injection-molded resin articles of the present invention are effective as molded articles having a sliding section, and examples of the molded articles having a sliding section include bearings, cams, pistons, hub pulleys for VTR cassettes, ratchet gears, small power transmission gears, bushings, switches, control levers of car heaters, air conditioners, etc., enclosures of instruments and devices having a rotary part receiver, recording cassette cases, etc.

It is of course possible to add, if necessary, dispersant, stabilizer, pigment, flame retardant, anti-static agent, and filler or reinforcing agent such as glass fiber to the resin composition used in the present invention.

Examples and comparative examples will now be described.

EXAMPLE 1

As the styrene resin used in the experiments, an ABS resin, Trademark "Cevian V #510", a product of Daicel Chemical Industries Ltd., was used, and as the polyphenylene ether resin, a resin "Noryl, grade 731 J" a product of EPL Co., was used.

The ester bond-containing polyamide compolymers (A) to (C) were those each prepared from 43, 50, or 74.2% by weight of laurylactam, 45.4, 41, or 21.3% by weight of $\alpha,\omega$-dihydroxy(polytetrahydrofuran) of a number-average molecular weight of 1000 and 11.6, 9, or 4.5% by weight of dodecanedicarboxylic acid. Ester bond-containing polyamide copolymer (D) was one prepared from 44.7% by weight of 12-aminododecanoic acid, 5.3% by weight of dodecanedicarboxylic acid, and 50.0% by weight of polycaprolactone-diol of an average molecular weight of 2000.

Ester bond-containing polyamide copolymer (E) was one prepared from 44.7% by weight of 12-aminododecanoic acid, 5.3% by weight of adipic acid, and 50.0% by weight of polycaprolactone-diol of an average-molecular weight of 2000, and ester bond-containing polyamide copolymer (F) is one prepared from 46.8% by weight of 12-aminododecanoic acid, 3.4% by weight of adipic acid, and 49.8% by weight of butylene glycol adipate polyester-diol of an average molecular weight of 2000.

According to the infrared spectrophotometry, each of the polyamide copolymers (A) to (E) was found to show an absorption peak around 1740 cm$^{-1}$, 1240 cm$^{-1}$, and 1110 cm$^{-1}$, so that it was confirmed that the polyamide copolymers had ester bonds. Absorptions of polyamide segments at 1550 cm$^{-1}$ and 1640 cm$^{-1}$ were also recognized.

The above listed starting materials were mixed to provide each composition as shown in Tables 1 and 2. Each mixture was kneaded and extruded by an extruder having a diameter of 40 mm and a L/D of 26 to produced pellets of the resin composition.

The resin composition in the form of pellets was injection-molded by an injection molding machine, TS-100, a tradename of Nissei Jushi Co., Ltd. Practical abrasion test pieces were molded for use with a Suzuki frictional abrasion tester and had a cylindrical form of an inside diameter of 20 mm $\phi$, an outside diameter of 26 mm $\phi$ and a height of 15 mm. The condition for molding the test pieces included a cylinder temperature of 225° C. (for a styrene resin) or 260° C. (for a polyphenylene ether resin), a die temperature of 50° C., an injection pressure of 65 kg/cm²-G, and a cycle of 60 sec. Test pieces for the measurement of mechanical properties were molded by the same injection molding machine under the same molding condition as those used in the molding of the frictional abrasion test pieces.

A frictional abrasion test and a mechanical strength test were carried out on the test pieces thus obtained.

The frictional abrasion test was performed as follows. A steel test piece of the same shape as that of the above test piece was set on the lower rotary section of the Suzuki frictional abrasion tester, a molded test piece of a resin mixture was set on the upper stationary section, and the measurement was performed without lubrication under a condition of sliding including a surface pressure of 1 kg/cm², and an average peripheral speed of 10 m/min. The measurement of mechanical properties was made according to the methods of ASTM D638, D790, and D256.

Tables 2 and 4 show the results obtained by the measurement made under the above conditions.

The specific abrasion loss (mm³/kg·km) was calculated according to the following equation:

$$\text{specific abrasion loss (mm}^3/\text{kg} \cdot \text{km)} = \frac{\text{abrasion loss (mg)}}{\text{density (mg/mm}^3) \times \text{contact pressure (kg/cm}^2) \times \text{contact area (cm}^2) \times \text{running distance (km)}}$$

TABLE 1

| Test No. | Examples | | | | | | | Comparative Examples | | | | |
|---|---|---|---|---|---|---|---|---|---|---|---|---|
| | M-1 | M-2 | M-3 | M-4 | M-5 | M-6 | M-7 | M-8 | M-9 | M-10 | M-11 | M-12 |
| Cevian #510 | 100 | 100 | 100 | 100 | 100 | 100 | 100 | 100 | 100 | 100 | 100 | 100 |
| Polyamide copolymer (A) | 2 | 5 | | | | | | | | | | |
| Polyamide copolymer (B) | | | 3 | 5 | 10 | | | | | | | |
| Polyamide copolymer (C) | | | | | | 5 | | | | | | |
| Polyamide copolymer (D) | | | | | | | 5 | | | | | |
| Daiamide L-1500 | | | | | | | | 5 | | | | |
| Daiamide X-2236 | | | | | | | | | 5 | | | |
| Glylucks A-250 | | | | | | | | | | 5 | | |
| Novamide ELY | | | | | | | | | | | 5 | |
| | | | | | | | | | | | | 5 |

TABLE 2

| Test No. | Examples | | | | | | | Comparative Examples | | | | |
|---|---|---|---|---|---|---|---|---|---|---|---|---|
| | M-1 | M-2 | M-3 | M-4 | M-5 | M-6 | M-7 | M-8 | M-9 | M-10 | M-11 | M-12 |
| Tensile strength kg/cm² | 502 | 497 | 493 | 478 | 459 | 498 | 503 | 519 | 516 | 504 | 488 | 511 |
| Tensile elongation % | 11.0 | 11.2 | 12.9 | 12.6 | 5.9 | 14.1 | 8.8 | 13.7 | 13.9 | 9.7 | 11.5 | 11.2 |
| Bending strength kg/mm² | 8.45 | 7.92 | 8.27 | 7.97 | 7.52 | 8.20 | 8.24 | 8.70 | 8.31 | 8.38 | 8.36 | 8.26 |
| Young's modulus in flexure kg/mm² | 275 | 260 | 267 | 259 | 246 | 264 | 261 | 268 | 266 | 264 | 266 | 257 |
| Izod impact strength kg·cm/cm | 5.5 | 5.7 | 6.3 | 6.4 | 4.5 | 4.5 | 4.6 | 6.3 | 2.9 | 3.7 | 4.4 | 3.4 |
| Coefficient of friction | 0.55 | 0.68 | 0.59 | 0.62 | 0.66 | 0.66 | 0.70 | 0.46 | 0.53 | 0.63 | 0.72 | 0.73 |
| Specific abrasion loss mm³/kg·km | 2.43 | 0.77 | 1.33 | 0.64 | 0.55 | 0.55 | 0.23 | 6.02 | 4.70 | 5.85 | 5.48 | 5.20 |

TABLE 3

| Test No. | Examples | | | | | | Comparative Examples | | | | |
|---|---|---|---|---|---|---|---|---|---|---|---|
| | M-13 | M-14 | M-15 | M-16 | M-17 | M-18 | M-19 | M-20 | M-21 | M-22 | M-23 |
| Noryl 731J | 100 | 100 | 100 | 100 | 100 | 100 | 100 | 100 | 100 | 100 | 100 |
| Polyamide copolymer (B) | 10 | 5 | 3 | 1 | | | | | | | |
| Polyamide copolymer (C) | | | | | 5 | | | | | | |
| Polyamide copolymer (D) | | | | | | 5 | | | | | |
| Daiamide L-1500 | | | | | | | 5 | | | | |
| Daiamide X-2236 | | | | | | | | 5 | | | |
| Glyluccks A-250 | | | | | | | | | 5 | | |
| Novamide ELY | | | | | | | | | | 5 | |
| | | | | | | | | | | | 5 |

TABLE 4

| Test No. | Examples | | | | | | Comparative Examples | | | | |
|---|---|---|---|---|---|---|---|---|---|---|---|
| | M-13 | M-14 | M-15 | M-16 | M-17 | M-18 | M-19 | M-20 | M-21 | M-22 | M-23 |
| Tensile strength kg/cm² | 390 | 492 | 500 | 512 | 500 | 494 | 519 | 510 | 505 | 495 | 496 |
| Tensile elongation % | 33.5 | 34.5 | 40.9 | 43.1 | 42.2 | 41.0 | 30.8 | 35.0 | 53.1 | 40.8 | 39.5 |
| Bending strength kg/mm² | 7.98 | 8.69 | 8.86 | 8.91 | 8.89 | 7.90 | 9.63 | 8.42 | 8.29 | 7.98 | 8.12 |
| Young's modulus in flexure kg/mm² | 205 | 219 | 227 | 231 | 222 | 207 | 241 | 230 | 211 | 205 | 203 |
| Izod impact strength kg·cm/cm | 14.0 | 15.3 | 15.3 | 15.4 | 15.3 | 14.0 | 14.4 | 14.0 | 14.0 | 13.7 | 15.2 |
| Coefficient of friction | 0.65 | 0.66 | 0.67 | 0.68 | 0.68 | 0.68 | 0.76 | 0.72 | 0.68 | 0.79 | 0.74 |
| Specific abrasion loss mm³/kg·km | 0.27 | 0.40 | 0.43 | 0.42 | 0.38 | 0.19 | 3.12 | 2.33 | 1.66 | 1.73 | 2.00 |

COMPARATIVE EXAMPLE 1

As in Example 1, the styrene resin used was an ABS resin, Cevian V 510 as tradename, a product of Daicel Chemical Industries Ltd., and the polyphenylene ether resin used was Noryl 731 J as tradename, a product of EPL Co. Materials added were nylon 12 homopolymer, nylon 12/6 copolymer, and polyether-amide elastomer.

The nylon 12 homopolymer and the nylon 12/6 copolymer were "Daiamides" grades L-1500 and X-2236, products of Daicel-Hüls, and the polyether-amide elastomers were Glylucks A-250, a product of Dainippon Ink & Chemicals, Inc., and Novamide ELY, a product of Mitsubishi Chemical Industries, Ltd.

When determined by an infrared spectrophotometer, Glylucks A-250 and Novamide ELY showed absorptions at 1110 $cm^{-1}$ and 1240 $cm^{-1}$, but did not show absorption at 1740 $cm^{-1}$, so that it was confirmed that they were polyamide polymers free of ester bonds.

The above materials were combined to form compositions, and these compositions were measured for frictional abrasion resistance and mechanical properties. The conditions for molding test pieces and the conditions for measurement were the same as those in Example 1.

Tables 1 and 3 show the mixing proportions in the Comparative Example. Tables 2 and 4 show the measurement results in the above case.

When a polyamide-containing polymer which had polyamide blocks but no ester bonds was added to a polystyrene resin or a polyphenylene ether resin, any improvement in frictional abrasion resistance could not be realized.

From the results of the present invention, it can be understood that the injection-molded resin articles obtained according to the present invention had a markedly improved specific abrasion loss of 2 $mm^3/kg\cdot km$ or below.

EXAMPLE 2

Compositions M-24 to M-34 were produced in the same manner as in Example 1 and their physical properties were measured.

Tables 5 and 6 show the mixing proportions of the compositions, and Table 7 shows their physical properties.

TABLE 5

| Test No. | Examples | | |
|---|---|---|---|
| | M-24 | M-25 | M-26 |
| Cevian #510 | 100 | 100 | 100 |

TABLE 5-continued

| Test No. | Examples | | |
|---|---|---|---|
| | M-24 | M-25 | M-26 |
| polyamide copolymer (A) | | | |
| polyamide copolymer (B) | 1 | 2 | |
| polyamide copolymer (C) | | | 2 |
| polyamide copolymer (D) | | | |

EXAMPLE 3 AND COMPARATIVE EXAMPLE 2

The polystyrene resins used were as follows. Polystrene, Estyrene G-20 as trademark, a product of Shin-Nippon Iron Manufacturing & Chemical Industry Co., Ltd., was used as a general-purpose polystyrene, and "Torpolex" grade 850 SE, trademark, a product of Mistui Toatsu Chemicals Inc., was used as a high-impact polystyrene. The resin used was Cevian-N 050 SF as tradename, a product of Daicel Chemical Industries Ltd.

Table 8 shows the mixing proportions of the compositions. Table 9 shows the physical properties of the compositions measured in the same manner as in Example 1.

TABLE 6

| Test No. | Examples | | | | | | | |
|---|---|---|---|---|---|---|---|---|
| | M-27 | M-28 | M-29 | M-30 | M-31 | M-32 | M-33 | M-34 |
| Cevian #510 | 100 | 100 | 100 | 100 | 100 | 100 | 100 | 100 |
| Polyamide (D) | 10 | 3 | 1 | | | | | |
| Polyamide (E) | | | | 10 | 5 | 3 | 1 | |
| Polyamide (F) | | | | | | | | 5 |

TABLE 7

| Test No. | Examples | | | | | | | | | | |
|---|---|---|---|---|---|---|---|---|---|---|---|
| | M-24 | M-25 | M-26 | M-27 | M-28 | M-29 | M-30 | M-31 | M-32 | M-33 | M-34 |
| tensile strength $kg/cm^2$ | 500 | 504 | 511 | 491 | 484 | 490 | 469 | 475 | 496 | 482 | 475 |
| tensile elongation % | 10.5 | 10.1 | 8.9 | 10.1 | 10.3 | 12.7 | 9.3 | 7.5 | 10.4 | 9.1 | 10.4 |
| bending strength $kg/mm^2$ | 8.03 | 8.52 | 8.58 | 7.38 | 7.64 | 7.87 | 6.93 | 6.91 | 7.85 | 7.28 | 7.28 |
| Young's molulus in flexure $kg/mm^2$ | 270 | 278 | 273 | 232 | 251 | 254 | 229 | 239 | 259 | 249 | 246 |
| Izod impact strength $kg\cdot cm/cm$ | 5.5 | 5.4 | 5.8 | 9.0 | 12.4 | 13.5 | 3.8 | 3.3 | 5.2 | 4.9 | 9.1 |
| coefficient of friction | 0.58 | 0.53 | 0.53 | 0.84 | 0.73 | 0.68 | 0.73 | 0.63 | 0.73 | 0.73 | 0.73 |
| specific abrasion loss $mm^3/kg\cdot km$ | 5.14 | 3.54 | 5.42 | 0.59 | 1.05 | 3.47 | 0.49 | 0.58 | 0.71 | 0.88 | 0.72 |

TABLE 8

| Sample No. | Examples | | | Comparative Examples | | |
|---|---|---|---|---|---|---|
| | O | P | Q | R | S | T |
| AS resin [Cevian-N] 050 SF | 100 | | | 100 | | |
| polystyrene "Estyrene" G-20 | | 100 | | | 100 | |
| high-impact polystyrene "Torpolex" 850 SE | | | 100 | | | 100 |
| Polyamide copolymer (B) | 5 | 5 | 5 | | | |

TABLE 9

| Sample No. | Examples | | | Comparative Examples | | |
|---|---|---|---|---|---|---|
| | O | P | Q | R | S | T |
| tensile strength kg/cm$^2$ | 724 | 438 | 297 | 729 | 497 | 280 |
| tensile elongation % | 5.3 | 3.4 | 19.1 | 4.3 | 3.4 | 30.0 |
| bending strength kg mm$^2$ | 10.69 | 6.74 | 4.99 | 11.56 | 7.12 | 4.97 |
| Young's modulus in flexure kg/mm$^2$ | 332 | 324 | 185 | 369 | 338 | 197 |
| Izod impact strength kg · cm/cm | 2.3 | 2.3 | 7.6 | 3.4 | 2.3 | 7.5 |
| coefficient of friction | 0.79 | 0.79 | 0.79 | 0.79 | 1.05 | 0.79 |
| specific abrasion loss mm$^3$/kg · km | 2.71 | 9.58 | 2.01 | 53.3 | 1240 | 32.9 |

The embodiments of the invention in which an exclusive property or privilege is claimed are defined as follows:

1. A resin composition suitable for injection molding, comprising:
   (1) 100 parts by weight of a thermoplastic injection moldable resin component consisting of
      (a) a first thermoplastic injection moldable resin selected from the group consisting of polystyrene, copolymer of styrene and acrylonitrile and copolymer of acrylonitrile, butadiene and styrene and
      (b) up to 50 percent by weight of a second thermoplastic injection moldable resin different from said first resin
   and
   (2) 0.01 to 50 parts by weight of a polyamide block copolymer consisting essentially of
      (a) 10 to 90 percent by weight of polyamide blocks prepared by polymerizing amino carboxylic acids having 6 to 12 carbon atoms, lactams having 6 to 12 carbon atoms, nylon salts prepared from diamines having from 6 to 12 carbon atoms and dicarboxylic acids having from 6 to 12 carbon atoms, and the balance is
      (b) polyester blocks or polyol blocks linked to said polyamide blocks by ester bonds wherein said second thermoplastic injection moldable resin is different from said polyamide block copolymer.

2. A resin composition as claimed in claim 1, in which said polyamide block copolymer comprises (a) a polyamide block and (b) a polyester block.

3. A resin composition as claimed in claim 1, in which said polyamide block copolymer comprises (a) a polyamide block and (c) a polyol block, both blocks having been linked with each other by an ester group.

4. A resin composition as claimed in claim 1, wherein said second resin is selected from the group consisting of:
   polycarbonate resin, vinyl chloride resin and polyolefin resin.

5. A resin composition as claimed in claim 1, wherein said aminocarboxylic acids are selected from the group consisting of:
   ω-aminocaproic acid, ω-aminoenanthic acid, ω-aminocaprylic acid, ω-aminopelargonic acid, ω-aminocapric acid, 11-aminoundecanoic acid and 12-aminododecanoic acid,
   said lactams are selected from the group consisting of: caprolactam and laurolactam,
   and said nylon salts are selected from the group consisting of nylons 6/6, 6/10, 6/12, 11/6, 11/10, 11/12, 12/6, 12/10 and 12/12.

6. A resin composition as claimed in claim 1, wherein said polyester blocks are (a) polyesters prepared from diacids and diols, said diacids being selected from the group consisting of phthalic acid, isophthalic acid, terephthalic acid, naphthalene-2,6-dicarboxylic acid, naphthalene-2,7-dicarboxylic acid, diphenyl-4,4'-dicarboxylic acid, diphenoxyethanedicarboxylic acid, 1,4-cyclohexanedicarboxylic acid, 1,2-cyclohexanedicarboxylic acid, dicyclohexyl-4,4'-dicarboxylic acid, succinic acid, oxalic acid, adipic acid, sebacic acid, and dodecanedioic acid, and said diols being selected from the group consisting of: ethylene glycol, diethylene glycol, triethylene glycol, tetraethylene glycol, propylene glycol, 1,4-butanediol, 1,3-butanediol, neopentyl glycol, 1,5-pentanediol, 1,6-hexanediol, polyethylene glycol, polypropylene glycol, and polytetramethylene glycol, or (b) polycaprolactone-polyesters being prepared from members of the group consisting of ε-caprolactone, ω-hydroxycaproic acid and $C_1$–$C_3$ alkyl esters thereof, and said polyol blocks being selected from the group consisting of polyols of a number-average molecular weight of 500–3000, comprising polyethylene glycol, poly(1,2-propylene oxide)glycol, poly(1,3-propylene oxide)glycol, poly(tetramethylene oxide)glycol, poly(hexamethylene oxide)glycol, ethylene oxide/propylene oxide block copolymers, ethylene oxide/propylene oxide random copolymers, ethylene oxide/tetrahydrofuran block copolymers and ethylene oxide/tetrahydrofuran random copolymers.

7. A resin composition as claimed in claim 1 in which the amount of said polyamide block copolymer is from 0.1 to 30 parts by weight.

8. A resin composition as claimed in claim 1 in which the amount of said polyamide block copolymer is from 0.5 to 15 parts by weight.

9. A resin composition as claimed in claim 7 in which said polyamide block copolymer contains 20 to 90 percent by weight of said polyamide blocks.

10. A resin composition as claimed in claim 8 in which said polyamide block copolymer contains 30 to 80 percent by weight of said polyamide blocks.

11. A resin composition as claimed in claim 1 in which said thermoplastic injection moldable resin component consists of a copolymer of acrylonitrile, butadiene and styrene.

12. A resin composition as claimed in claim 1, consisting of a mixture of (1) and (2).

13. An article which has been obtained by injection-moulding the resin composition as defined in claim 1.

* * * * *